Aug. 11, 1964     K. W. TANTLINGER ETAL     3,144,141
ALIGNMENT RAMP
Filed Nov. 27, 1961
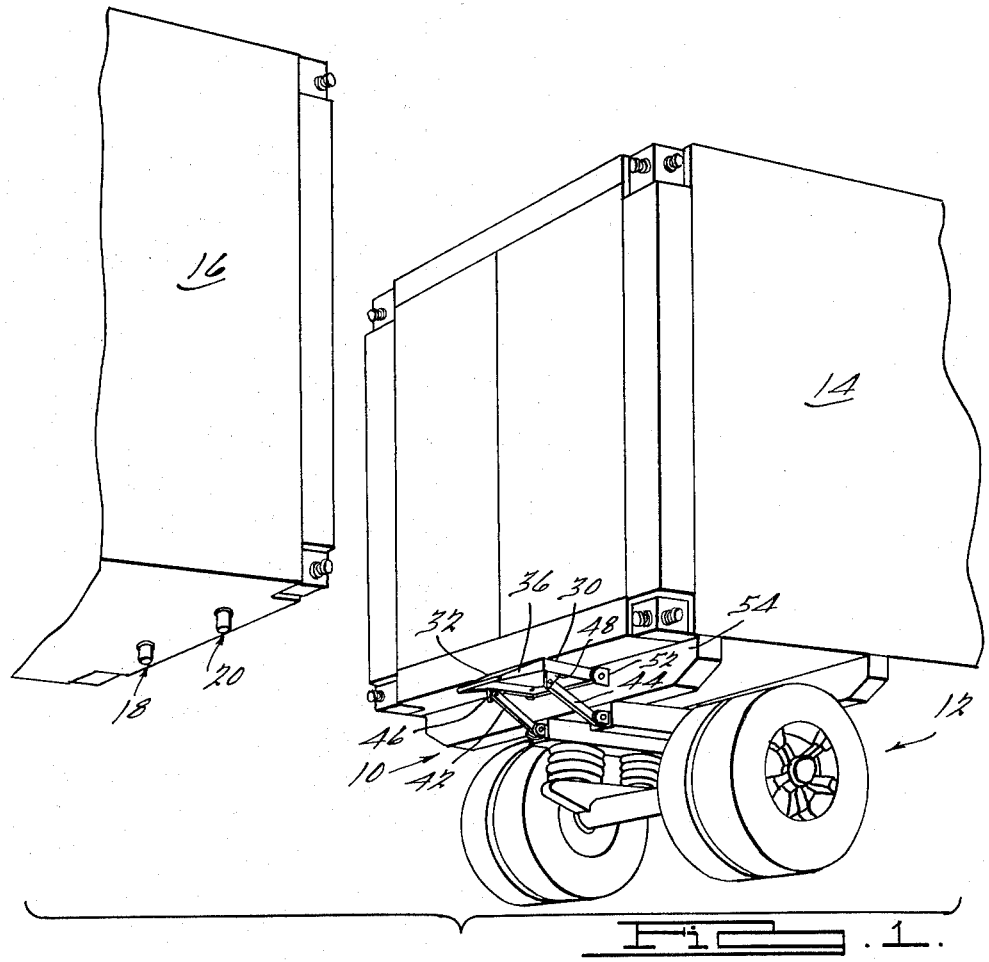
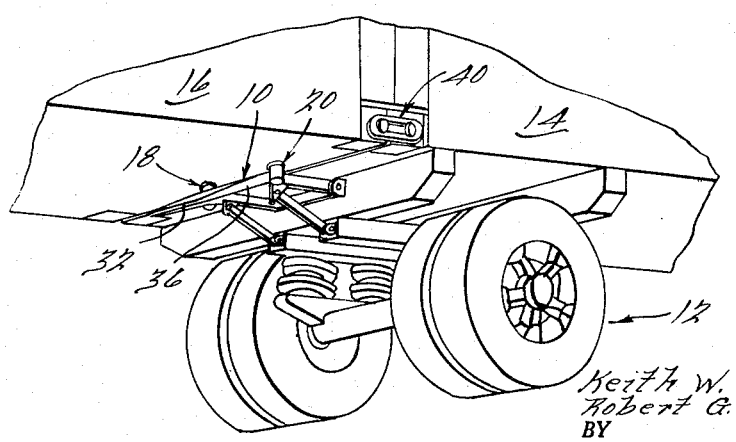
INVENTORS.
Keith W. Tantlinger
Robert G. Flagan
BY
Harness, Dickey & Pierce.
ATTORNEYS.

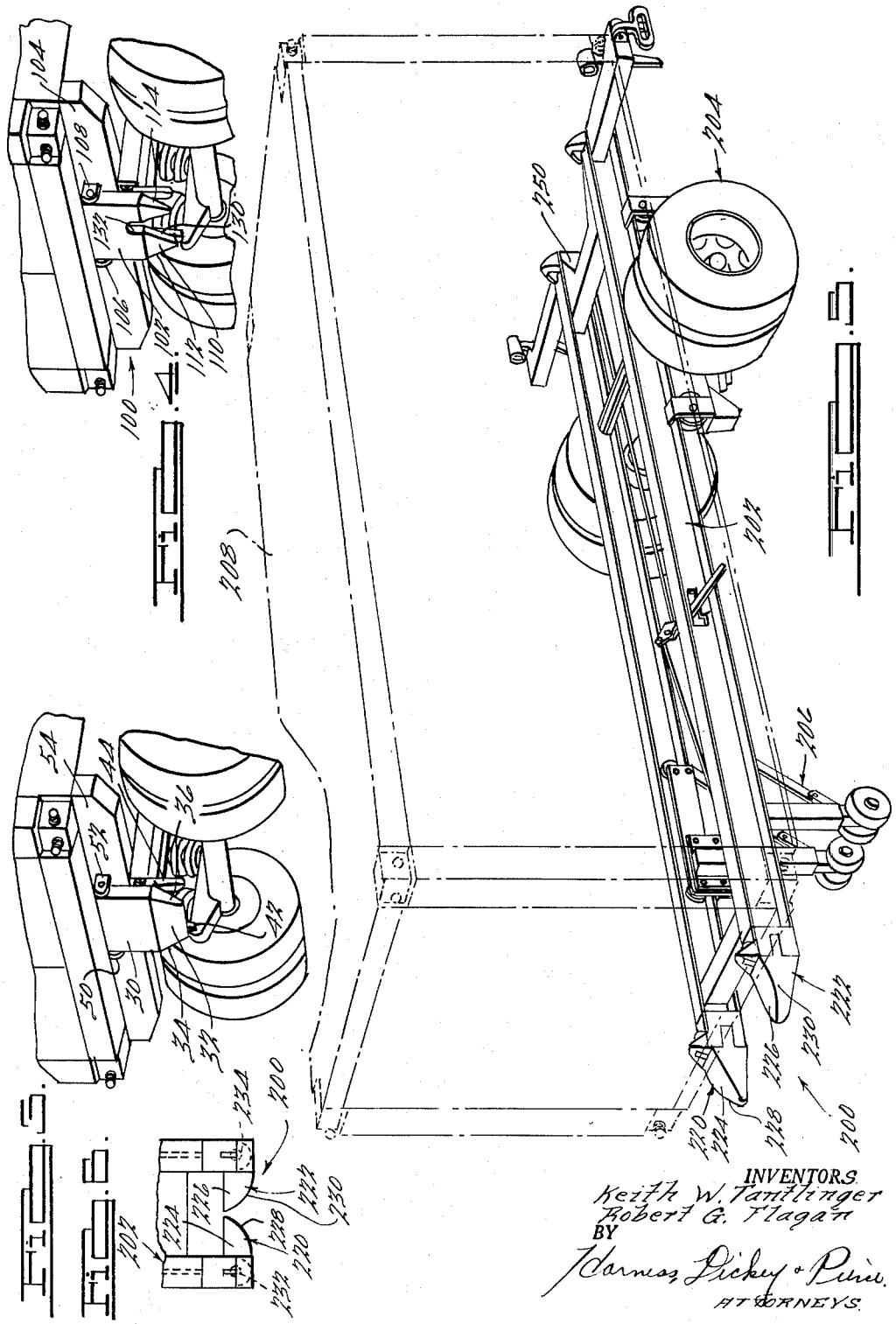

3,144,141
ALIGNMENT RAMP

Keith W. Tantlinger, Grosse Pointe Shores, and Robert G. Flagan, Grosse Pointe Park, Mich., assignors to Fruehauf Corporation, a corporation of Michigan
Filed Nov. 27, 1961, Ser. No. 154,987
1 Claim. (Cl. 214—10.5)

This application relates generally to wheeled vehicles and more particularly to an alignment ramp for a container supporting chassis or the like.

The advent of the modular shipping container that accepts a cargo for shipment in a sealed condition has stimulated the development of an entirely new approach to the materials handling problem. Such containers are generally loaded at one point, sealed, and retained in the sealed condition until arrival at a destination, and, because of their modular configuration, can be handled either singly or in a multiple by standardized handling equipment. This is more particularly disclosed in application Serial No. 112,635 filed May 25, 1961 for: Shipping Apparatus and assigned to the assignee of the present invention.

A problem has arisen in aligning shipping containers of the aforementioned type, so that they can be coupled for shipment in a multiple configuration to a common destination. Tractive effort is transmitted through the containers themselves in a manner more particularly set forth in said application Serial No. 112,635. Thus, it is required that the containers be brought into relatively precise longitudinal alignment to effect coupling thereof to form a structural unit.

The instant invention solves this problem by providing a foldable alignment ramp on the front end of a container chassis that is engageable with a complementary structure on the rear end of a second container chassis to effect alignment of the containers mounted on the chassis and coupling thereof, as by container ties disclosed in the aforementioned application Serial No. 112,635. The alignment ramp is foldable to a stored condition when not in use to facilitate shipment of the container as a single unit.

Accordingly, one object of the instant invention is an alignment ramp for a container frame.

Another object is a folding alignment ramp for a container frame.

Another object is an alignment ramp for a container frame that effects both vertical and horizontal gathering of a pair of container frames as they move toward one another.

Other objects and advantages of the instant invention will be apparent in the following specification, claims and drawings wherein:

FIGURE 1 is a perspective view of an aligning ramp in operative association with a pair of shipping containers shown prior to coupling thereof to form a multiple unit;

FIG. 2 is a perspective view similar to FIGURE 1 showing the aligning ramp and containers in the coupled condition;

FIG. 3 is a perspective view similar to FIG. 2 of the ramp folded to the downwardly depending stored condition;

FIG. 4 is a perspective view similar to FIGURE 1 of a modified alignment ramp folded to the downwardly depending or stored condition;

FIG. 5 is a view similar to FIG. 3 of a modified form of alignment ramp shown in operative association with a vehicle frame and wheel suspension;

FIG. 6 is a fragmentary view of the alignment ramp of FIG. 5 folded to the stored condition.

Referring to FIGURE 1 of the drawings, an alignment ramp 10, in accordance with an exemplary constructed embodiment of the instant invention, is shown in operative association with a wheel suspension 12. The wheel suspension 12 is adapted to be secured to, for example, a shipping container 14, by any suitable means, to facilitate highway travel.

As more particularly set forth in the aforesaid application Serial No. 112,635, it is often desirable to connect a pair of shipping containers, for example, the shipping containers 14 and 16 for shipment to a common destination. The alignment ramp 10 facilitates such coupling cooperation with a pair of complementary pins 18 and 20 on the container 16, as will be described.

The alignment ramp 10 has a plate or deck portion 30 having a downwardly depending frontal edge portion 32 that effects vertical gathering of the containers 14 and 16 as they move into juxtaposed relationship with one another. As best seen in FIG. 3 of the drawings, the frontal edge portion 32 of the ramp 10 has outwardly convergent edge portions 34 and 36 that are engageable with the pins 18 and 20, respectively, to effect horizontal gathering and alignment of the containers 14 and 16 as they move into juxtaposed relationship.

After the containers 14 and 16 have been coupled as by a container tie 40, more particularly described in application Serial No. 112,635, the ramp 10 is foldable to the downwardly depending or stored condition as by disengaging a pair of angularly downwardly extending arms 42 and 44 from engagement with complementary stops 46 and 48 on the underside of the plate 30, respectively. The ramp 10 is supported for rotation by a pair of ramp support brackets 50 and 52 that are secured to a cross bolster 54 of the suspension 12, as by welding.

As best seen in FIG. 4 of the drawings, a modified alignment ramp 100 comprises a plate portion 102 that is pivotally supported with respect to a cross bolster 104 of a wheel suspension (not shown) as by a pair of support brackets 106 and 108. The plate portion 102 has an angularly related frontal edge portion 110 similar to the edge portion 32 of the alignment ramp 10 to facilitate vertical gathering of a pair of shipping containers as they move into juxtaposed relationship. The alignment ramp 100 has convergent edge portions 112 and 114 on the frontal edge 110 thereof that are engageable with complementary pins 18 and 20 when the alignment ramp 100 is coupled to a container having the spaced pins 18 and 20.

The alignment ramp 100 differs from the ramp 10 in that it is compatible with containers having only a single centrally located pin, as opposed to a pair of downwardly depending pins 18 and 20. Lateral gathering of the containers is effected by a V-shaped groove 130 having a circular seat 132 for the acceptance of the single pin (not shown). Thus, as the pin moves into the V-groove 130, the pin then is laterally gathered with respect to the alignment ramp 100.

As best seen in FIG. 5, a modified form of alignment ramp 200 is shown in operative association with a vehicle frame 202. The frame 202 is provided with a conventional wheel suspension 204 and landing gear 206. A container 208 (shown in phantom view) is mounted on the frame 202.

In accordance with the instant invention, the alignment ramp 200 for the container frame 202 comprises a pair of alignment projections 220 and 222 having downwardly inclined top surfaces 224 and 226, respectively, and convergent outer edge faces 228 and 230, respectively. It will be appreciated that the faces 224 and 226 on the projections 220 and 222, respectively, effect vertical gathering of the container frame 202 with respect to an adjacent shipping container having the pins similar to the pins 18 and 20 on the container 16.

Similarly, the convergent outer edge faces 228 and 230 effect lateral horizontal gathering upon engagement thereof with pins similar to the pins 18 and 20 on the container 16.

As best seen in FIG. 6 of the drawings, the projections 220 and 222 are pivotable about vertically extending shafts to a condition where they are pointed toward and aligned with one another in a stored condition.

As best seen in FIG. 5 of the drawing, the frame 202 may be provided with an alignment recess 250 of similar horizontal cross sectional configuration as the horizontal cross section of the alignment ramp 200, thereby to facilitate alignment of the frame 202 with a similar frame.

From the aforementioned description, it should be apparent that an alignment ramp in accordance with the instant invention is relatively rugged in construction, is relatively easily foldable to a stored condition, yet effects positive alignment of a pair of shipping containers so as to facilitate coupling thereof into a multiple configuration for shipment.

It is to be understood that the specific constructions of the improved alignment ramp herein disclosed and described are presented for the purpose of explanation and illustration and are not intended to indicate limits of the invention, the scope of which is defined by the following claims.

What is claimed is:

Shipping apparatus comprising a pair of shipping containers of generally rectangular horizontal cross section, means for coupling said shipping containers to one another in end to end abutting relationship for shipment in the coupled condition, an alignment ramp normally disposed entirely within the rectangular horizontal cross section of one of said containers, means supporting said alignment ramp for pivotal movement relative to said one container between said position entirely within the horizontal cross section thereof and a position wherein said ramp extends generally horizontally outwardly of the horizontal cross section of said one container, said alignment ramp having an angularly downwardly extending upwardly facing surface and a pair of laterally spaced convergent vertically extending surfaces, the other of said containers having a horizontal downwardly facing surface complementary to and engageable with the angularly downwardly extending surface on said one container to effect vertical gathering of said one container upon movement thereof towards said other container, and a pair of laterally spaced vertically extending surfaces complementary to and engageable with the vertically extending convergent surfaces on said one container to effect lateral gathering of said one container upon movement thereof towards said other container.

References Cited in the file of this patent
UNITED STATES PATENTS

| | | |
|---|---|---|
| 502,510 | Dorn | Aug. 1, 1893 |
| 557,694 | Pendexter | Apr. 7, 1896 |
| 1,155,713 | Eldridge | Oct. 5, 1915 |
| 1,418,966 | Perin | June 6, 1922 |
| 2,543,295 | McGregor et al. | Feb. 27, 1951 |
| 3,000,649 | Heer et al. | Sept. 19, 1961 |
| 3,004,772 | Bohlen et al. | Oct. 17, 1961 |
| 3,074,575 | Terho | Jan. 22, 1963 |